US006825585B1

(12) United States Patent
Kalldin et al.

(10) Patent No.: US 6,825,585 B1
(45) Date of Patent: Nov. 30, 2004

(54) END PLATE

(75) Inventors: Hans-Olof Kalldin, deceased, late of Vasteras (SE); by Birgitta Grenblad, legal representative, Vasteras (SE); Gunnar Kylander, Vasteras (SE); Mats Leijon, Vasteras (SE); Bengt Goran, Vasteras (SE); Arne Edman, Vasteras (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/355,753

(22) PCT Filed: Feb. 2, 1998

(86) PCT No.: PCT/SE98/00163

§ 371 (c)(1),
(2), (4) Date: Mar. 17, 2000

(87) PCT Pub. No.: WO98/34323

PCT Pub. Date: Aug. 6, 1998

(30) Foreign Application Priority Data

Feb. 3, 1997 (SE) ............................................. 9700349
Nov. 28, 1997 (SE) ............................................. 9704422

(51) Int. Cl.[7] ............................. H02K 1/20; H02K 9/00
(52) U.S. Cl. ............................ 310/65; 310/54; 310/259
(58) Field of Search ........................... 310/59, 260, 270

(56) References Cited

U.S. PATENT DOCUMENTS

| 681,800 A | 8/1901 | Lasche |
| 847,008 A | 3/1907 | Kitsee |
| 1,304,451 A | 5/1919 | Burnham |
| 1,418,856 A | 6/1922 | Williamson |
| 1,481,585 A | 1/1924 | Beard |
| 1,508,456 A | 9/1924 | Lenz |
| 1,728,915 A | 9/1929 | Blankenship et al. |
| 1,742,985 A | 1/1930 | Burnham |

(List continued on next page.)

FOREIGN PATENT DOCUMENTS

| AT | 399780 | 7/1995 |
| BE | 565063 | 2/1957 |
| CH | 391071 | 4/1965 |
| CH | 266037 | 10/1965 |
| CH | 534448 | 2/1973 |
| CH | 539328 | 7/1973 |

(List continued on next page.)

OTHER PUBLICATIONS

Shipboard Electrical Insulation; G. L. Moses, 1951 pp2&3.
ABB Elkrafthandbok; ABB AB; 1988 ; pp274–276.
Elkraft teknisk Handbok, 2 Elmaskiner; A. Alfredsson et al; 1988, pp121–123.
High Voltage Cables in a New Class of Generators Power-former; M. Leijon et al; Jun. 14, 1999; pp1–8.
Ohne Transformator direkt ins Netz; Owman et al, ABB, AB; Feb. 8, 1999; pp48–51.

(List continued on next page.)

*Primary Examiner*—Burton Mullins
(74) *Attorney, Agent, or Firm*—Oblon, Spivak, McClelland, Maier & Neustadt, P.C.

(57) ABSTRACT

An end plate (1, 11) for a stator (31) wound with a cable in a rotating electric machine, the plate (1, 11) being provided with axially running winding slots (2) corresponding to the stator (31) and axially running apertures (19, 21, 22, 26) for cooling tubes corresponding to the stator (31), and that the plate (1, 11) is provided with at least one bending member (20, 23, 27) pre-shaped in the plate (1, 11) for cooling tubes (33) insertable into the cooling-tube apertures (19, 21, 22, 26) and also a procedure for supporting and protecting a cooling tube in a first axially running aperture at its exit from a stator in a rotating electric machine, whereby an end plate provided with bending members is applied at the end of the stator, the cooling tube being bent around the bending member before continuing, either by being fitted in a second axially running aperture in the stator or for extension out of the stator.

22 Claims, 5 Drawing Sheets

U.S. PATENT DOCUMENTS

| | | |
|---|---|---|
| 1,747,507 A | 2/1930 | George |
| 1,756,672 A | 4/1930 | Barr |
| 1,762,775 A | 8/1930 | Ganz |
| 1,781,308 A | 11/1930 | Vos |
| 1,881,182 A | 5/1932 | Hendey et al. |
| 1,904,885 A | 4/1933 | Seeley |
| 1,974,406 A | 9/1934 | Apple et al. |
| 2,006,170 A | 8/1935 | Juhlin |
| 2,206,856 A | 7/1940 | Shearer |
| 2,217,430 A | 10/1940 | Baudry |
| 2,241,832 A | 5/1941 | Wahlquist |
| 2,251,291 A | 6/1941 | Reichalt |
| 2,256,897 A | 9/1941 | Davidson et al. |
| 2,295,415 A | 9/1942 | Monroe |
| 2,409,893 A | 10/1946 | Pendleton et al. |
| 2,415,652 A | 2/1947 | Norton |
| 2,424,443 A | 7/1947 | Evans |
| 2,436,308 A | 2/1948 | Johnson |
| 2,446,999 A | 6/1948 | Carnilli |
| 2,459,322 A | 1/1949 | Johnston |
| 2,462,651 A | 2/1949 | Lord |
| 2,498,238 A | 2/1950 | Berberich et al. |
| 2,650,350 A | 8/1953 | Heath |
| 2,721,905 A | 10/1955 | Monroe |
| 2,749,456 A | 6/1956 | Luenberger |
| 2,780,771 A | 2/1957 | Lee |
| 2,846,599 A | 8/1958 | McAdam |
| 2,885,581 A | 5/1959 | Pileggi |
| 2,943,242 A | 6/1960 | Schaschi et al. |
| 2,947,957 A | 8/1960 | Spindler |
| 2,959,699 A | 11/1960 | Smith et al. |
| 2,962,679 A | 11/1960 | Stratton |
| 2,975,309 A | 3/1961 | Seidner |
| 3,014,139 A | 12/1961 | Shildneck |
| 3,098,893 A | 7/1963 | Pringle et al. |
| 3,130,335 A | 4/1964 | Rejda |
| 3,143,269 A | 8/1964 | Van Eldik |
| 3,157,806 A | 11/1964 | Wiedemann |
| 3,158,770 A | 11/1964 | Coggeshall et al. |
| 3,197,723 A | 7/1965 | Dortort |
| 3,268,768 A | 8/1966 | Amos |
| 3,304,599 A | 2/1967 | Nordin |
| 3,354,331 A | 11/1967 | Broeker et al. |
| 3,365,657 A | 1/1968 | Webb |
| 3,372,283 A | 3/1968 | Jaecklin |
| 3,392,779 A | 7/1968 | Tilbrook |
| 3,411,027 A | 11/1968 | Rosenberg |
| 3,418,530 A | 12/1968 | Cheever |
| 3,435,262 A | 3/1969 | Bennett et al. |
| 3,437,858 A | 4/1969 | White |
| 3,444,407 A | 5/1969 | Yates |
| 3,447,002 A | 5/1969 | Ronnevig |
| 3,484,690 A | 12/1969 | Wald |
| 3,541,221 A | 11/1970 | Aupoix et al. |
| 3,560,777 A | 2/1971 | Moeller |
| 3,571,690 A | 3/1971 | Lataisa |
| 3,593,123 A | 7/1971 | Williamson |
| 3,619,674 A | * 11/1971 | Daimo et al. ................ 310/54 |
| 3,631,519 A | 12/1971 | Salahshourian |
| 3,644,662 A | 2/1972 | Salahshourian |
| 3,651,244 A | 3/1972 | Silver et al. |
| 3,651,402 A | 3/1972 | Leffmann |
| 3,660,721 A | 5/1972 | Baird |
| 3,666,876 A | 5/1972 | Forster |
| 3,670,192 A | 6/1972 | Andersson et al. |
| 3,675,056 A | 7/1972 | Lenz |
| 3,684,821 A | 8/1972 | Miyauchi et al. |
| 3,684,906 A | 8/1972 | Lexz |
| 3,699,238 A | 10/1972 | Hansen et al. |
| 3,716,652 A | 2/1973 | Lusk et al. |
| 3,716,719 A | 2/1973 | Angelery et al. |
| 3,727,085 A | 4/1973 | Goetz et al. |
| 3,740,600 A | 6/1973 | Turley |
| 3,743,867 A | 7/1973 | Smith, Jr. |
| 3,746,954 A | 7/1973 | Myles et al. |
| 3,758,699 A | 9/1973 | Lusk et al. |
| 3,778,891 A | 12/1973 | Amasino et al. |
| 3,781,739 A | 12/1973 | Meyer |
| 3,787,607 A | 1/1974 | Schiafly |
| 3,792,399 A | 2/1974 | McLyman |
| 3,801,843 A | 4/1974 | Corman et al. |
| 3,809,933 A | 5/1974 | Sugawara et al. |
| 3,813,764 A | 6/1974 | Tanaka et al. |
| 3,820,048 A | 6/1974 | Ohta et al. |
| 3,828,115 A | 8/1974 | Hvizd, Jr. |
| 3,881,647 A | 5/1975 | Wolfe |
| 3,884,154 A | 5/1975 | Marten |
| 3,891,880 A | 6/1975 | Britsch |
| 3,902,000 A | 8/1975 | Forsyth et al. |
| 3,912,957 A | 10/1975 | Reynolds |
| 3,932,779 A | 1/1976 | Madsen |
| 3,932,791 A | 1/1976 | Oswald |
| 3,943,392 A | 3/1976 | Keuper et al. |
| 3,947,278 A | 3/1976 | Youtsey |
| 3,963,950 A | * 6/1976 | Watanabe et al. ............ 310/54 |
| 3,965,408 A | 6/1976 | Higuchi et al. |
| 3,968,388 A | 7/1976 | Lambrecht et al. |
| 3,971,543 A | 7/1976 | Shanahan |
| 3,974,314 A | 8/1976 | Fuchs |
| 3,993,860 A | 11/1976 | Snow et al. |
| 3,995,785 A | 12/1976 | Arick et al. |
| 4,001,616 A | 1/1977 | Lonseth et al. |
| 4,008,367 A | 2/1977 | Sunderhauf |
| 4,008,409 A | 2/1977 | Rhudy et al. |
| 4,031,310 A | 6/1977 | Jachimowicz |
| 4,039,740 A | 8/1977 | Iwata |
| 4,041,431 A | 8/1977 | Enoksen |
| 4,047,138 A | 9/1977 | Steigerwald |
| 4,064,419 A | 12/1977 | Peterson |
| 4,084,307 A | 4/1978 | Schultz et al. |
| 4,085,347 A | 4/1978 | Lichius |
| 4,088,953 A | 5/1978 | Sarian |
| 4,091,138 A | 5/1978 | Takagi et al. |
| 4,091,139 A | 5/1978 | Quirk |
| 4,099,227 A | 7/1978 | Liptak |
| 4,103,075 A | 7/1978 | Adam |
| 4,106,069 A | 8/1978 | Trautner et al. |
| 4,107,092 A | 8/1978 | Carnahan et al. |
| 4,109,098 A | 8/1978 | Olsson et al. |
| 4,121,148 A | 10/1978 | Platzer |
| 4,132,914 A | 1/1979 | Khutoretsky et al. |
| 4,134,036 A | 1/1979 | Curtiss |
| 4,134,055 A | 1/1979 | Akamatsu |
| 4,134,146 A | 1/1979 | Stetson |
| 4,149,101 A | 4/1979 | Lesokhin et al. |
| 4,152,615 A | 5/1979 | Calfo et al. |
| 4,160,193 A | 7/1979 | Richmond |
| 4,164,672 A | 8/1979 | Flick |
| 4,164,772 A | 8/1979 | Hingorani |
| 4,177,397 A | 12/1979 | Lill |
| 4,177,418 A | 12/1979 | Brueckner et al. |
| 4,184,186 A | 1/1980 | Barkan |
| 4,200,817 A | 4/1980 | Bratoljic |
| 4,200,818 A | 4/1980 | Ruffing et al. |
| 4,206,434 A | 6/1980 | Hase |
| 4,207,427 A | 6/1980 | Beretta et al. |
| 4,207,482 A | 6/1980 | Neumeyer et al. |
| 4,208,597 A | * 6/1980 | Mulach et al. ................ 310/59 |
| 4,229,721 A | 10/1980 | Koloczek et al. |
| 4,238,339 A | 12/1980 | Khutoretsky et al. |
| 4,239,999 A | 12/1980 | Vinokurov et al. |

| | | | | | | |
|---|---|---|---|---|---|---|
| 4,245,182 A | 1/1981 | Aotsu et al. | | 4,594,630 A | 6/1986 | Rabinowitz et al. |
| 4,246,694 A | 1/1981 | Raschbichler et al. | | 4,607,183 A | 8/1986 | Rieber et al. |
| 4,255,684 A | 3/1981 | Mischler et al. | | 4,615,109 A | 10/1986 | Wcislo et al. |
| 4,258,280 A | 3/1981 | Starcevic | | 4,615,778 A | 10/1986 | Elton |
| 4,262,209 A | 4/1981 | Berner | | 4,618,795 A | 10/1986 | Cooper et al. |
| 4,274,027 A | 6/1981 | Higuchi et al. | | 4,619,040 A | 10/1986 | Wang et al. |
| 4,281,264 A | 7/1981 | Keim et al. | | 4,622,116 A | 11/1986 | Elton et al. |
| 4,292,558 A | 9/1981 | Flick et al. | | 4,633,109 A | 12/1986 | Feigel |
| 4,307,311 A | 12/1981 | Grozinger | | 4,650,924 A | 3/1987 | Kauffman et al. |
| 4,308,476 A | 12/1981 | Schuler | | 4,652,963 A | 3/1987 | Fahlen |
| 4,308,575 A | 12/1981 | Mase | | 4,656,316 A | 4/1987 | Meltsch |
| 4,310,966 A | 1/1982 | Breitenbach | | 4,656,379 A | 4/1987 | McCarty |
| 4,314,168 A | 2/1982 | Breitenbach | | 4,663,603 A | 5/1987 | van Riemsdijk et al. |
| 4,317,001 A | 2/1982 | Silver et al. | | 4,677,328 A | 6/1987 | Kumakura |
| 4,320,645 A | 3/1982 | Stanley | | 4,687,882 A | 8/1987 | Stone et al. |
| 4,321,426 A | 3/1982 | Schaeffer | | 4,692,731 A | 9/1987 | Osinga |
| 4,321,518 A | 3/1982 | Akamatsu | | 4,723,083 A | 2/1988 | Elton |
| 4,326,181 A | 4/1982 | Allen | | 4,723,104 A | 2/1988 | Rohatyn |
| 4,330,726 A | 5/1982 | Albright et al. | | 4,724,345 A | 2/1988 | Elton et al. |
| 4,337,922 A | 7/1982 | Streiff et al. | | 4,732,412 A | 3/1988 | van der Linden et al. |
| 4,341,989 A | 7/1982 | Sandberg et al. | | 4,737,704 A | 4/1988 | Kalinnikov et al. |
| 4,347,449 A | 8/1982 | Beau | | 4,745,314 A | 5/1988 | Nakano |
| 4,347,454 A | 8/1982 | Gellert et al. | | 4,761,602 A | 8/1988 | Leibovich |
| 4,353,612 A | 10/1982 | Meyers | | 4,766,365 A | 8/1988 | Bolduc et al. |
| 4,357,542 A | 11/1982 | Kirschbaum | | 4,771,168 A | 9/1988 | Gundersen et al. |
| 4,360,748 A | 11/1982 | Raschbichler et al. | | 4,785,138 A | 11/1988 | Breitenbach et al. |
| 4,361,723 A | 11/1982 | Hvizd, Jr. et al. | | 4,795,933 A | 1/1989 | Sakai |
| 4,365,178 A | 12/1982 | Lexz | | 4,827,172 A | 5/1989 | Kobayashi |
| 4,367,425 A | 1/1983 | Mendelsohn et al. | | 4,845,308 A | 7/1989 | Womack, Jr. et al. |
| 4,367,890 A | 1/1983 | Spirk | | 4,847,747 A | 7/1989 | Abbondanti |
| 4,368,418 A | 1/1983 | Demello et al. | | 4,853,565 A | 8/1989 | Elton et al. |
| 4,369,389 A | 1/1983 | Lambrecht | | 4,859,810 A | 8/1989 | Cloetens et al. |
| 4,371,745 A | 2/1983 | Sakashita | | 4,859,989 A | 8/1989 | McPherson |
| 4,384,944 A | 5/1983 | Silver et al. | | 4,860,430 A | 8/1989 | Raschbichler et al. |
| 4,387,316 A | 6/1983 | Katsekas | | 4,864,266 A | 9/1989 | Feather et al. |
| 4,401,920 A | 8/1983 | Taylor et al. | | 4,883,230 A | 11/1989 | Lindstrom |
| 4,403,163 A | 9/1983 | Armerding et al. | | 4,890,040 A | 12/1989 | Gundersen |
| 4,404,486 A | 9/1983 | Keim et al. | | 4,894,284 A | 1/1990 | Yamanouchi et al. |
| 4,411,710 A | 10/1983 | Mochizuki et al. | | 4,914,386 A | 4/1990 | Zocholl |
| 4,421,284 A | 12/1983 | Pan | | 4,918,347 A | 4/1990 | Takaba |
| 4,425,521 A | 1/1984 | Rosenberry, Jr. et al. | | 4,918,835 A | 4/1990 | Wcislo et al. |
| 4,426,771 A | 1/1984 | Wang et al. | | 4,924,342 A | 5/1990 | Lee |
| 4,429,244 A | 1/1984 | Nikiten et al. | | 4,926,079 A | 5/1990 | Niemela et al. |
| 4,431,960 A | 2/1984 | Zucker | | 4,942,326 A | 7/1990 | Butler, III et al. |
| 4,432,029 A | 2/1984 | Lundqvist | | 4,949,001 A | 8/1990 | Campbell |
| 4,437,464 A | 3/1984 | Crow | | 4,982,147 A | 1/1991 | Lauw |
| 4,443,725 A | 4/1984 | Derderian et al. | | 4,994,952 A | 2/1991 | Silva et al. |
| 4,470,884 A | 9/1984 | Carr | | 4,997,995 A | 3/1991 | Simmons et al. |
| 4,473,765 A | 9/1984 | Butman, Jr. et al. | | 5,012,125 A | 4/1991 | Conway |
| 4,475,075 A | 10/1984 | Munn | | 5,030,813 A | 7/1991 | Stanisz |
| 4,477,680 A | 10/1984 | Asato | | 5,036,165 A | 7/1991 | Elton et al. |
| 4,481,438 A | 11/1984 | Keim | | 5,036,238 A | 7/1991 | Tajima |
| 4,484,106 A | 11/1984 | Taylor et al. | | 5,066,881 A | 11/1991 | Elton et al. |
| 4,488,079 A | 12/1984 | Dailey et al. | | 5,067,046 A | 11/1991 | Elton et al. |
| 4,490,651 A | 12/1984 | Taylor et al. | | 5,083,360 A | 1/1992 | Valencic et al. |
| 4,503,284 A | 3/1985 | Minnick et al. | | 5,086,246 A | 2/1992 | Dymond et al. |
| 4,508,251 A | 4/1985 | Harada et al. | | 5,091,609 A | 2/1992 | Swada et al. |
| 4,510,077 A | 4/1985 | Elton | | 5,094,703 A | 3/1992 | Takaoka et al. |
| 4,517,471 A | 5/1985 | Sachs | | 5,095,175 A | 3/1992 | Yoshida et al. |
| 4,520,287 A | 5/1985 | Wang et al. | | 5,097,241 A | 3/1992 | Smith et al. |
| 4,523,249 A | 6/1985 | Arimoto | | 5,097,591 A | 3/1992 | Wcislo et al. |
| 4,538,131 A | 8/1985 | Baier et al. | | 5,111,095 A | 5/1992 | Hendershot |
| 4,546,210 A | 10/1985 | Akiba et al. | | 5,124,607 A | 6/1992 | Rieber et al. |
| 4,551,780 A | 11/1985 | Canay | | 5,136,459 A | 8/1992 | Fararooy |
| 4,552,990 A | 11/1985 | Persson et al. | | 5,140,290 A | 8/1992 | Dersch |
| 4,557,038 A | 12/1985 | Wcislo et al. | | 5,153,460 A | 10/1992 | Bovino et al. |
| 4,560,896 A | 12/1985 | Vogt et al. | | 5,168,662 A | 12/1992 | Nakamura et al. |
| 4,565,929 A | 1/1986 | Baskin et al. | | 5,171,941 A | 12/1992 | Shimizu et al. |
| 4,571,453 A | 2/1986 | Takaoka et al. | | 5,175,396 A | 12/1992 | Emery et al. |
| 4,588,916 A | 5/1986 | Lis | | 5,182,537 A | 1/1993 | Thuis |
| 4,590,416 A | 5/1986 | Porche et al. | | 5,187,428 A | 2/1993 | Hutchison et al. |

| | | | | | |
|---|---|---|---|---|---|
| 5,231,249 A | 7/1993 | Kimura et al. | DE | 572030 | 3/1933 |
| 5,235,488 A | 8/1993 | Koch | DE | 584639 | 9/1933 |
| 5,246,783 A | 9/1993 | Spenadel et al. | DE | 586121 | 10/1933 |
| 5,264,778 A | 11/1993 | Kimmel et al. | DE | 604972 | 11/1934 |
| 5,287,262 A | 2/1994 | Klein | DE | 629301 | 4/1936 |
| 5,293,146 A | 3/1994 | Aosaki et al. | DE | 673545 | 3/1939 |
| 5,304,883 A | 4/1994 | Denk | DE | 719009 | 3/1942 |
| 5,305,961 A | 4/1994 | Errard et al. | DE | 848583 | 8/1952 |
| 5,321,308 A | 6/1994 | Johncock | DE | 875227 | 4/1953 |
| 5,323,330 A | 6/1994 | Asplund et al. | DE | 975999 | 1/1963 |
| 5,325,008 A | 6/1994 | Grant | DE | 1465719 | 5/1969 |
| 5,325,259 A | 6/1994 | Paulsson | DE | 1807391 | 5/1970 |
| 5,327,637 A | 7/1994 | Britenbach et al. | DE | 2050674 | 5/1971 |
| 5,341,281 A | 8/1994 | Skibinski | DE | 1638176 | 6/1971 |
| 5,343,139 A | 8/1994 | Gyugyi et al. | DE | 2155371 | 5/1973 |
| 5,355,046 A | 10/1994 | Weigelt | DE | 2400698 | 7/1975 |
| 5,365,132 A | 11/1994 | Hann et al. | DE | 2520511 | 11/1976 |
| 5,387,890 A | 2/1995 | Estop et al. | DE | 2656389 | 6/1978 |
| 5,397,513 A | 3/1995 | Steketee, Jr. | DE | 2721905 | 11/1978 |
| 5,399,941 A | 3/1995 | Grothaus et al. | DE | 137164 | 8/1979 |
| 5,400,005 A | 3/1995 | Bobry | DE | 138840 | 11/1979 |
| 5,408,169 A | 4/1995 | Jeanneret | DE | 2824951 | 12/1979 |
| 5,449,861 A | 9/1995 | Fujino et al. | DE | 2835386 | 2/1980 |
| 5,452,170 A | 9/1995 | Ohde et al. | DE | 2839517 | 3/1980 |
| 5,468,916 A | 11/1995 | Litenas et al. | DE | 2854520 | 6/1980 |
| 5,499,178 A | 3/1996 | Mohan | DE | 3009102 | 9/1980 |
| 5,500,632 A | 3/1996 | Halser, III | DE | 2913697 | 10/1980 |
| 5,510,942 A | 4/1996 | Bock et al. | DE | 2920478 | 12/1980 |
| 5,530,307 A | 6/1996 | Horst | DE | 3028777 | 3/1981 |
| 5,533,658 A | 7/1996 | Benedict et al. | DE | 2939004 | 4/1981 |
| 5,534,754 A | 7/1996 | Poumey | DE | 3006382 | 8/1981 |
| 5,545,853 A | 8/1996 | Hildreth | DE | 3008818 | 9/1981 |
| 5,550,410 A | 8/1996 | Titus | DE | 209313 | 4/1984 |
| 5,583,387 A | 12/1996 | Takeuchi et al. | DE | 3305225 | 8/1984 |
| 5,587,126 A | 12/1996 | Steketee, Jr. | DE | 3309051 | 9/1984 |
| 5,598,137 A | 1/1997 | Alber et al. | DE | 3441311 | 5/1986 |
| 5,607,320 A | 3/1997 | Wright | DE | 3543106 | 6/1987 |
| 5,612,510 A | 3/1997 | Hildreth | DE | 2917717 | 8/1987 |
| 5,663,605 A | 9/1997 | Evans et al. | DE | 3612112 | 10/1987 |
| 5,672,926 A | 9/1997 | Brandes et al. | DE | 3726346 | 2/1989 |
| 5,689,223 A | 11/1997 | Demarmels et al. | DE | 3925337 | 2/1991 |
| 5,807,447 A | 9/1998 | Forrest | DE | 4023903 | 11/1991 |
| 5,834,699 A | 11/1998 | Buck et al. | DE | 4022476 | 1/1992 |
| 5,886,433 A * | 3/1999 | Oda et al. ............... 310/59 | DE | 4233556 | 3/1994 |
| 5,902,958 A * | 5/1999 | Haxton ................. 174/47 | DE | 4402184 | 8/1995 |
| | | | DE | 4409794 | 8/1995 |
| FOREIGN PATENT DOCUMENTS | | | DE | 4412761 | 10/1995 |
| CH | 646403 | 2/1979 | DE | 4420322 | 12/1995 |
| CH | 657482 | 8/1986 | DE | 19620906 | 1/1996 |
| CH | 1189322 | 10/1986 | DE | 4438186 | 5/1996 |
| DE | 40414 | 8/1887 | DE | 19020222 | 3/1997 |
| DE | 134022 | 12/1901 | DE | 19547229 | 6/1997 |
| DE | 277012 | 7/1914 | DE | 468827 | 7/1997 |
| DE | 336418 | 6/1920 | EP | 049104 | 4/1982 |
| DE | 372390 | 3/1923 | EP | 0493704 | 4/1982 |
| DE | 386561 | 12/1923 | EP | 0056580 A1 | 7/1982 |
| DE | 387973 | 1/1924 | EP | 078908 | 5/1983 |
| DE | 406371 | 11/1924 | EP | 0120154 | 10/1984 |
| DE | 425551 | 2/1926 | EP | 0130124 | 1/1985 |
| DE | 426793 | 3/1926 | EP | 0142813 | 5/1985 |
| DE | 432169 | 7/1926 | EP | 0155405 | 9/1985 |
| DE | 433749 | 9/1926 | EP | 0102513 | 1/1986 |
| DE | 435608 | 10/1926 | EP | 0174783 | 3/1986 |
| DE | 435609 | 10/1926 | EP | 0185788 | 7/1986 |
| DE | 441717 | 3/1927 | EP | 0277358 | 8/1986 |
| DE | 443011 | 4/1927 | EP | 0234521 | 9/1987 |
| DE | 460124 | 5/1928 | EP | 0244069 | 11/1987 |
| DE | 482506 | 9/1929 | EP | 0246377 | 11/1987 |
| DE | 501181 | 7/1930 | EP | 0285868 | 5/1988 |
| DE | 523047 | 4/1931 | EP | 0274691 | 7/1988 |
| DE | 568508 | 1/1933 | EP | 0280759 | 9/1988 |

| | | | | | |
|---|---|---|---|---|---|
| EP | 0282876 | 9/1988 | GB | 870583 | 6/1961 |
| EP | 0309096 | 3/1989 | GB | 913386 | 12/1962 |
| EP | 0314860 | 5/1989 | GB | 965741 | 8/1964 |
| EP | 0316911 | 5/1989 | GB | 992249 | 5/1965 |
| EP | 0317248 | 5/1989 | GB | 1024583 | 3/1966 |
| EP | 0335430 | 10/1989 | GB | 1053337 | 12/1966 |
| EP | 0342554 | 11/1989 | GB | 1059123 | 2/1967 |
| EP | 0221404 | 5/1990 | GB | 1103099 | 2/1968 |
| EP | 0375101 | 6/1990 | GB | 1117401 | 6/1968 |
| EP | 0406437 | 1/1991 | GB | 1135242 | 12/1968 |
| EP | 0439410 | 7/1991 | GB | 1147049 | 4/1969 |
| EP | 0440865 | 8/1991 | GB | 1157885 | 7/1969 |
| EP | 0469155 A1 | 2/1992 | GB | 1174659 | 12/1969 |
| EP | 0490705 | 6/1992 | GB | 1236082 | 6/1971 |
| EP | 0503817 | 9/1992 | GB | 1268770 | 3/1972 |
| EP | 0571155 | 11/1993 | GB | 1319257 | 6/1973 |
| EP | 0620570 | 10/1994 | GB | 1322433 | 7/1973 |
| EP | 0620630 | 10/1994 | GB | 1340983 | 12/1973 |
| EP | 0642027 | 3/1995 | GB | 1341050 | 12/1973 |
| EP | 0671632 | 9/1995 | GB | 1365191 | 8/1974 |
| EP | 0676777 | 10/1995 | GB | 1395152 | 5/1975 |
| EP | 0677915 | 10/1995 | GB | 1424982 | 2/1976 |
| EP | 0684679 | 11/1995 | GB | 1426594 | 3/1976 |
| EP | 0684682 | 11/1995 | GB | 1438610 | 6/1976 |
| EP | 0695019 | 1/1996 | GB | 1445284 | 8/1976 |
| EP | 0732787 | 9/1996 | GB | 1479904 | 7/1977 |
| EP | 0738034 | 10/1996 | GB | 1493163 | 11/1977 |
| EP | 0739087 A2 | 10/1996 | GB | 1502938 | 3/1978 |
| EP | 0740315 | 10/1996 | GB | 1525745 | 9/1978 |
| EP | 0749190 A2 | 12/1996 | GB | 2000625 | 1/1979 |
| EP | 0751605 | 1/1997 | GB | 1548633 | 7/1979 |
| EP | 0739087 A3 | 3/1997 | GB | 2046142 | 11/1979 |
| EP | 0749193 A3 | 3/1997 | GB | 2022327 | 12/1979 |
| EP | 0780926 | 8/1997 | GB | 2025150 | 1/1980 |
| EP | 0802542 | 10/1997 | GB | 2034101 | 5/1980 |
| EP | 0913912 A1 | 5/1999 | GB | 1574796 | 9/1980 |
| FR | 805544 | 4/1936 | GB | 2070341 | 9/1981 |
| FR | 841351 | 1/1938 | GB | 2070470 | 9/1981 |
| FR | 847899 | 12/1938 | GB | 2071433 | 9/1981 |
| FR | 916959 | 12/1946 | GB | 2081523 | 2/1982 |
| FR | 1011924 | 4/1949 | GB | 2099635 | 12/1982 |
| FR | 1126975 | 3/1955 | GB | 2105925 | 3/1983 |
| FR | 1238795 | 7/1959 | GB | 2106306 | 4/1983 |
| FR | 2108171 | 5/1972 | GB | 2106721 | 4/1983 |
| FR | 2251938 | 6/1975 | GB | 2136214 | 9/1984 |
| FR | 2305879 | 10/1976 | GB | 2140195 | 11/1984 |
| FR | 2376542 | 7/1978 | GB | 2150153 | 6/1985 |
| FR | 2467502 | 4/1981 | GB | 1103096 | 2/1988 |
| FR | 2481531 | 10/1981 | GB | 2268337 | 1/1994 |
| FR | 2556146 | 6/1985 | GB | 2273819 | 8/1994 |
| FR | 2594271 | 8/1987 | GB | 2283133 | 4/1995 |
| FR | 2708157 | 1/1995 | GB | 2289992 | 12/1995 |
| GB | 123906 | 3/1919 | GB | 2 289 992 | 12/1995 |
| GB | 268271 | 3/1927 | GB | 2308490 | 8/1997 |
| GB | 293861 | 11/1928 | GB | 2332557 | 6/1999 |
| GB | 292999 | 4/1929 | HU | 175494 | 11/1981 |
| GB | 319313 | 7/1929 | JP | 60206121 | 3/1959 |
| GB | 518993 | 3/1940 | JP | 57043529 | 8/1980 |
| GB | 537609 | 6/1941 | JP | 57126117 | 5/1982 |
| GB | 540456 | 10/1941 | JP | 59076156 | 10/1982 |
| GB | 589071 | 8/1947 | JP | 59159642 | 2/1983 |
| GB | 666883 | 2/1952 | JP | 6264964 | 9/1985 |
| GB | 685416 | 1/1953 | JP | 1129737 | 5/1989 |
| GB | 702892 | 1/1954 | JP | 62320631 | 6/1989 |
| GB | 715226 | 9/1954 | JP | 3245748 | 2/1990 |
| GB | 723457 | 2/1955 | JP | 4179107 | 11/1990 |
| GB | 739962 | 11/1955 | JP | 318253 | 1/1991 |
| GB | 763761 | 12/1956 | JP | 424909 | 1/1992 |
| GB | 805721 | 12/1958 | JP | 5290947 | 4/1992 |
| GB | 827600 | 2/1960 | JP | 6196343 | 12/1992 |
| GB | 854728 | 11/1960 | JP | 6233442 | 2/1993 |

| | | | | | |
|---|---|---|---|---|---|
| JP | 6325629 | 5/1993 | WO | WO9745927 | 12/1997 |
| JP | 7057951 | 8/1993 | WO | WO9745928 | 12/1997 |
| JP | 7264789 | 3/1994 | WO | WO9745929 | 12/1997 |
| JP | 8167332 | 12/1994 | WO | WO9745930 | 12/1997 |
| JP | 7161270 | 6/1995 | WO | WO9745931 | 12/1997 |
| JP | 8264039 | 11/1995 | WO | WO9745932 | 12/1997 |
| JP | 9200989 | 1/1996 | WO | WO9745933 | 12/1997 |
| JP | 8036952 | 2/1996 | WO | WO9745934 | 12/1997 |
| JP | 8167360 | 6/1996 | WO | WO9745935 | 12/1997 |
| JP | 2017474 | 1/1999 | WO | WO9745936 | 12/1997 |
| LU | 67199 | 3/1972 | WO | WO9745937 | 12/1997 |
| SE | 90308 | 9/1937 | WO | WO9745938 | 12/1997 |
| SE | 305899 | 11/1968 | WO | WO9745939 | 12/1997 |
| SE | 255156 | 2/1969 | WO | WO9747067 | 12/1997 |
| SE | 341428 | 12/1971 | WO | WO9820595 | 5/1998 |
| SE | 453236 | 1/1982 | WO | WO9820596 | 5/1998 |
| SE | 457792 | 6/1987 | WO | WO9820597 | 5/1998 |
| SE | 502417 | 12/1993 | WO | WO 98/20598 | 5/1998 |
| SU | 792302 | 1/1971 | WO | WO9820600 | 5/1998 |
| SU | 425268 | 9/1974 | WO | WO 98/20602 | 5/1998 |
| SU | 1019553 | 1/1980 | WO | WO9821385 | 5/1998 |
| SU | 694939 | 1/1982 | WO | PCT/FR 98/00468 | 6/1998 |
| SU | 955369 | 8/1983 | WO | WO9827634 | 6/1998 |
| SU | 1511810 | 5/1987 | WO | WO9827635 | 6/1998 |
| WO | WO8202617 | 8/1982 | WO | WO9827636 | 6/1998 |
| WO | WO8502302 | 5/1985 | WO | WO9829927 | 7/1998 |
| WO | WO9011389 | 10/1990 | WO | WO9829928 | 7/1998 |
| WO | WO9012409 | 10/1990 | WO | WO9829929 | 7/1998 |
| WO | PCT/DE 90/00279 | 11/1990 | WO | WO9829930 | 7/1998 |
| WO | WO9101059 | 1/1991 | WO | WO9829931 | 7/1998 |
| WO | WO9101585 | 2/1991 | WO | WO9829932 | 7/1998 |
| WO | WO9107807 | 3/1991 | WO | WO9833731 | 8/1998 |
| WO | PCT SE 91/00077 | 4/1991 | WO | WO9833736 | 8/1998 |
| WO | WO9109442 | 6/1991 | WO | WO9833737 | 8/1998 |
| WO | WO 91/11841 | 8/1991 | WO | WO9834238 | 8/1998 |
| WO | WO8115862 | 10/1991 | WO | WO 98/34239 | 8/1998 |
| WO | WO 91/15755 | 10/1991 | WO | WO9834240 | 8/1998 |
| WO | WO9201328 | 1/1992 | WO | WO9834241 | 8/1998 |
| WO | WO9203870 | 3/1992 | WO | WO9834242 | 8/1998 |
| WO | WO9321681 | 10/1993 | WO | WO9834243 | 8/1998 |
| WO | WO9406194 | 3/1994 | WO | WO9834244 | 8/1998 |
| WO | WO9518056 | 7/1995 | WO | WO9834245 | 8/1998 |
| WO | WO9522153 | 8/1995 | WO | WO9834246 | 8/1998 |
| WO | WO9524049 | 9/1995 | WO | WO9834247 | 8/1998 |
| WO | WO9622606 | 7/1996 | WO | WO9834248 | 8/1998 |
| WO | WO9622607 | 7/1996 | WO | WO9834249 | 8/1998 |
| WO | PCT/CN 96/00010 | 10/1996 | WO | WO9834250 | 8/1998 |
| WO | WO9630144 | 10/1996 | WO | WO9834309 | 8/1998 |
| WO | WO9710640 | 3/1997 | WO | WO9834312 | 8/1998 |
| WO | WO9711831 | 4/1997 | WO | WO9834315 | 8/1998 |
| WO | WO9716881 | 5/1997 | WO | WO9834321 | 8/1998 |
| WO | WO 97/29494 | 8/1997 | WO | WO9834322 | 8/1998 |
| WO | WO9745288 | 12/1997 | WO | WO9834323 | 8/1998 |
| WO | WO9745847 | 12/1997 | WO | WO9834325 | 8/1998 |
| WO | WO9745848 | 12/1997 | WO | WO9834326 | 8/1998 |
| WO | WO9745906 | 12/1997 | WO | WO9834327 | 8/1998 |
| WO | WO9745907 | 12/1997 | WO | WO9834328 | 8/1998 |
| WO | WO 97/45908 | 12/1997 | WO | WO9834329 | 8/1998 |
| WO | WO9745912 | 12/1997 | WO | WO9834330 | 8/1998 |
| WO | WO9745914 | 12/1997 | WO | WO9834331 | 8/1998 |
| WO | WO9745915 | 12/1997 | WO | WO 98/40627 | 9/1998 |
| WO | WO9745916 | 12/1997 | WO | WO 98/43336 | 10/1998 |
| WO | WO9745918 | 12/1997 | WO | WO9917309 | 4/1999 |
| WO | WO9745919 | 12/1997 | WO | WO9917311 | 4/1999 |
| WO | WO9745920 | 12/1997 | WO | WO9917312 | 4/1999 |
| WO | WO9745921 | 12/1997 | WO | WO9917313 | 4/1999 |
| WO | WO9745922 | 12/1997 | WO | WO9917314 | 4/1999 |
| WO | WO9745923 | 12/1997 | WO | WO9917315 | 4/1999 |
| WO | WO9745924 | 12/1997 | WO | WO9917316 | 4/1999 |
| WO | WO9745925 | 12/1997 | WO | WO9917422 | 4/1999 |
| WO | WO9745926 | 12/1997 | WO | WO9917424 | 4/1999 |

| | | |
|---|---|---|
| WO | WO9917425 | 4/1999 |
| WO | WO9917426 | 4/1999 |
| WO | WO9917427 | 4/1999 |
| WO | WO9917428 | 4/1999 |
| WO | WO9917429 | 4/1999 |
| WO | WO9917432 | 4/1999 |
| WO | WO9917433 | 4/1999 |
| WO | WO9919963 | 4/1999 |
| WO | WO9919969 | 4/1999 |
| WO | WO9919970 | 4/1999 |
| WO | PCT/SE 98/02148 | 6/1999 |
| WO | WO9927546 | 6/1999 |
| WO | WO9928919 | 6/1999 |
| WO | WO9928921 | 6/1999 |
| WO | WO 99/28922 | 6/1999 |
| WO | WO9928923 | 6/1999 |
| WO | WO9928924 | 6/1999 |
| WO | WO9928925 | 6/1999 |
| WO | WO9928926 | 6/1999 |
| WO | WO9928927 | 6/1999 |
| WO | WO9928928 | 6/1999 |
| WO | WO9928929 | 6/1999 |
| WO | WO9928930 | 6/1999 |
| WO | WO9928931 | 6/1999 |
| WO | WO9928934 | 6/1999 |
| WO | WO9928994 | 6/1999 |
| WO | WO9929005 | 6/1999 |
| WO | WO 99/29005 | 6/1999 |
| WO | WO9929008 | 6/1999 |
| WO | WO9929011 | 6/1999 |
| WO | WO9929012 | 6/1999 |
| WO | WO9929013 | 6/1999 |
| WO | WO9929014 | 6/1999 |
| WO | WO9929015 | 6/1999 |
| WO | WO9929016 | 6/1999 |
| WO | WO9929017 | 6/1999 |
| WO | WO9929018 | 6/1999 |
| WO | WO9929019 | 6/1999 |
| WO | WO9929020 | 6/1999 |
| WO | WO9929021 | 6/1999 |
| WO | WO9929022 | 6/1999 |
| WO | WO 99/29023 | 6/1999 |
| WO | WO9929024 | 6/1999 |
| WO | WO 99/29025 | 6/1999 |
| WO | WO9929026 | 6/1999 |
| WO | WO9929029 | 6/1999 |
| WO | WO9929034 | 6/1999 |

OTHER PUBLICATIONS

Submersible Motors and Wet–Rotor Motors for Centrifugal Pumps Submerged in the Fluid Handled; K. Blenick, KSB; Feb. 25, 1988; pp9–17.

High Voltage Generators; G. Beschastnov et al; 1977; vol. 48, No. 6 pp1–7.

Eine neue Type von Unterwassermotoren; Electrotechnik und Mascinenbam, 49; Aug. 1931; pp2–3.

Problems in design of the 110–500kV high–voltage generators; Nikitl et al; World Electrotechical Congress; Jun. 21–27 1977; Section 1, Paper #18.

Manufacture and Testing of Roebel bars; P. Martl et al; 1960, Pub.86, vol. 8, pp 25–31.

Hydroalternators of 110 to 220 kV Elektrotechn. Obz., vol. 64, No. 3, pp132–136 Mar. 1975; A. Abramov.

Design Concepts for an Amorphous Metal Distribution Transformer; E. Boyd et al; IEEE 11/84.

Neue Wege zum Bau zweipoliger Turbogeneratoren bis 2 GVA, 60kV Elektrotechnik und Maschinenbau Wien Janner 1972, Heft 1; Seite 1–11; G. Aichholzer.

Optimizing designs of water–resistant magnet wire; V. Kuzenev et al; Elektrotekhnika, vol. 59, No 12, pp35–40, 1988.

Zur Entwicklung der Tauchpumpenmotoren; A. Schanz; KSB, pp19–24.

Direct Generation of alternating current at high voltages; R. Parsons; IEEE Journal, vol. 67 #393, Jan. 15, 1929; pp1065–1080.

Stopfbachsiose Umwalzpumpen– ein wichtiges Element im modemen Kraftwerkbau; H. Hotz, KSB 1, pp13–19, 1960.

Zur Geschichte der Brown Boveri–Synchron–Maschinen; Vierzig Jahre Generatorbau; Jan.–Feb. 1931 pp15–39.

Technik und Anwendung modemer Tauchpumpen; A. Heumann; 1987.

High capacity synchronous generator having no tooth stator; V.S. Kidlshev et al; No. 1, 1977 pp11–16.

Der Asynchronmotor ais Antrieb stopfbcichsloser Pumpen; E. Picmaus; Eletrotechnik und Maschinenbay No. 78, pp153–155, 1961.

Low core loss rotating flux transformer; R. F. Krause, et al; American Institute Physics J.Appl.Phys vol. 64 #10 Nov. 1988, pp5376–5378.

An EHV bulk Power transmission line Made with Low Loss XLPE Cable;Ichihara et al; 6/92; pp3–6.

Underground Transmission Systems Reference Book; 1992; pp16–19; pp36–45; pp67–81.

Power System Stability and Control; P. Kundur, 1994; pp23–25; p. 767.

Six phase Synchronous Machine with AC and DC Stator Connections, Part II:Harmonic Studies and a proposed Uninterruptible Power Supply Scheme; R. Schiferl et al.; Aug. 1983 pp 2694–2701.

Six phase Synchronous Machine with AC and DC Stator Connections, Part 1; Equivalent circuit representation and Steady–State Analysis; R. Schiferl et al; Aug. 1983; pp2685–2693.

Reactive Power Compensation; T. Petersson; 1993; pp 1–23.

Permanent Magnet Machines; K. Binns; 1987; pp 9–1 through 9–26.

Hochspannungsaniagen for Wechselstrom; 97. Hochspannungsaufgaben an Generatoren und Motoren; Roth et al; 1938; pp452–455.

Hochspannungsaniagen for Wechselstrom; 97. Hochspannungsaufgaben an Generatoren und Motoren; Roth et al; Spring 1959, pp30–33.

Neue Lbsungswege zum Entwurf grosser Turbogeneratoren bis 2GVA, 60kV; G. Aichotzer; Sep. 1974, pp249–255.

Advanced Turbine–generators—an assessment; A. Appleton, et al; International Conf. Proceedings, Lg HV Elec. Sys. Paris, FR, Aug.–Sep./1976, vol. I, Section 11–02, p. 1–9.

Fully slotless turbogenerators; E. Spooner; Proc., IEEE vol. 120 #12, Dec. 1973.

Toroidal winding geometry for high voltage superconducting alternators; J. Kirtley et al; MIT—Elec. Power Sys. Engrg. Lab for IEEE PES;Feb. 1974.

High–Voltage Stator Winding Development; D. Albright et al; Proj. Report EL339, Project 1716, Apr. 1984.

Powerformer™ A giant step in power plant engineering; Owman et al; CIGRE 1996, Paper 11:1.1.

Thin Type DC/DC Converter using a coreless wire transformer; K. Onda et al; Proc. IEEE Power Electronics Spec. Conf.; Jun. 1994, pp330–334.

Development of extruded polymer insulated superconducting cable; Jan. 1992.

Transformer core losses; B. Richardson; Proc. IEEE May 1986, pp365–368.
Cloth–transformer with divided windings and tension annealed amorphous wire; T. Yammamoto et al; IEEE Translation Journal on Magnetics in Japan vol. 4, No. 9 Sep. 1989.
A study of equipment sizes and constraints for a unified power flow controller; J Bian et al; IEEE 1996.
U.S. patent application Ser. No. 09/541,523, pending.
A test installation of a self–tuned ac filter in the Konti–Skan 2 HVDC link; T. Holmgren,G. Asplund, S. Valdemarsson, P. Hidman of ABB; U. Jonsson of Svenska Kraftnat; O. Ioof of Vattenfall Vastsverige AB; IEEE Stockholm Power Tech Conference Jun. 1995, pp 64–70.
Analysis of faulted Power Systems; P Anderson, Iowa State University Press / Ames, Iowa, 1973, pp 255–257.
36–Kv. Generators Arise from Insulation Research; P. Sidler; *Electrical World* Oct. 15, 1932, ppp 524.
Oil Water cooled 300 MW turbine generator;L.P. Gnedin et al;*Elektrotechnika* , 1970, pp 6–8.
J&P Transformer Book 11$^{th}$ Edition;A.C. Franklin et al; owned by Butterworth—Heinemann Ltd, Oxford Printed by Hartnolls Ltd in Great Britain 1983, pp29–67.
Transformerboard; H.P. Moser et al; 1979, pp 1–19.
The Skagerrak transmission—the world's longest HVDC submarine cable link; L. Haglof et al of ASEA; ASEA Journal vol. 53, No. 1–2, 1980, pp 3–12.
Direct Connection of Generators to HVDC Converters: Main Characteristics and Comparative Advantages; J.Arrillaga et al; *Electra* No. 149, Aug. 1993, pp 19–37.
Our flexible friend article; M. Judge; *New Scientist,* May 10, 1997, pp 44–48.
In–Service Performance of HVDC Converter transformers and oil–cooled smoothing reactors; G.L. Desilets et al; *Electra* No. 155, Aug. 1994, pp 7–29.
Transformateurs a courant continu haute tension–examen des specifications; A. Lindroth et al; *Electra* No 141, Apr. 1992, pp 34–39.
Development of a Termination for the 77 kV–Class High Tc Superconducting Power Cable; T. Shimonosono et al; IEEE Power Delivery, vol. 12, No 1, Jan. 1997, pp 33–38.
Verification of Limiter Performance in Modern Excitation Control Systems; G. K. Girgis et al; IEEE Energy Conservation, vol. 10, No. 3, Sep. 1995, pp 538–542.
A High Initial response Brushless Excitation System; T. L. Dillman et al; IEEE Power Generation Winter Meeting Proceedings, Jan. 31, 1971, pp 2089–2094.
Design, manufacturing and cold test of a superconducting coil and its cryosat for SMES applications; A. Bautista et al; IEEE Applied Superconductivity, vol. 7, No. 2, Jun. 1997, pp 853–856.
Quench Protection and Stagnant Normal Zones in a Large Cryostable SMES; Y. Lvovsky et al; IEEE Applied Superconductivity, vol. 7, No. 2, Jun. 1997, pp 857–860.
Design and Construction of the 4 Tesla Background Coil for the Navy SMES Cable Test Apparatus; D.W. Scherbarth et al; IEEE Appliel Superconductivity, vol. 7, No. 2, Jun. 1997, pp 840–843.
High Speed Synchronous Motors Adjustable Speed Drives; ASEA Generation Pamphlet OG 135–101 E, Jan. 1985, pp 1–4.
Billig burk motar overtonen; A. Felidin; ERA (TEKNIK) Aug. 1994, pp 26–28.
400–kV XLPE cable system passes CIGRE test; ABB Article; ABB Review Sep. 1995, pp 38.

FREQSYN—a new drive system for high power applications; J–A. Bergman et al; ASEA Journal 59, Apr. 1986, pp16–19.
Canadians Create Conductive Concrete; J. Beaudoin et al; *Science,* vol. 276, May 23, 1997, pp 1201.
Fully Water–Cooled 190 MVA Generators in the Tonstad Hydroelectric Power Station; E. Ostby et al; BBC Review Aug. 1969, pp 380–385.
Relocatable static var compensators help control unbundled power flows; R. C. Knight et al; *Transmission & Distribution,* Dec. 1996, pp 49–54.
Investigation and Use of Asynchronized Machines in Power Systems; N.I.Blotskii et al; *Elektrichestvo,* No. 12, 1–6, 1985, pp 90–99.
Variable–speed switched reluctance motors; P.J. Lawrenson et al; IEE proc, vol. 187 Pt.B, No. 4, Jul. 1980, pp 253–265.
Das Einphasenwechselstromsystem hoherer Frequenz; J.G. Heft; Elektrische Bahnen eb; Dec. 1987, pp 388–389.
Power Transmission by Direct Current;E. Uhlmann; ISBN 3–540–07122–9 Springer–Verlag, Berlin/Heidelberg/New York; 1975, pp 327–328.
Elektriska Maskiner; F. Gustavson; Institute for Elkreafteknilk, KTH; Stockholm, 1996, pp 3–6–3–12.
Die Wechselstromtechnik; A. Cour' Springer Verlag, Germany; 1936, pp 586–598.
Insulation systems for superconducting transmission cables; O. Toennesen; Nordic Insulation Symposium, Bergen, 1996, pp 425–432.
MPTC: An economical alternative to universal power flow controllers;N. Mohan; EPE 1997, Trondheim, pp 3.1027–3.1030.
Lexikon der Technik; Luger; Band 2, Grundlagen der Elektrotechnik und Kerntechnik, 1960, pp 395.
Das Handbuch der Lokomotiven ( hungarian locomotive V40 1'D'); B. Hollingsworth et al; Pawlak Verlagsgesellschaft; 1933, pp. 254–255.
Synchronous machines wth single or double 3–phase star–connected winding fed by 12–pulse load commutated inverter. Simulation of operational behaviour; C. Ivarson et al; ICEM 1994, International Conference on electrical machines, vol. 1, pp 267–272.
Elkrafthandboken, Elmaskiner; A. Rejminger; Elkrafthandboken, Elmaskiner 1996, 15–20.
Power Electronics—in Theory and Practice; K. Thorborg; ISBN 0–86238–341–2, 1993, pp 1–13.
Regulating transformers in power systems—new concepts and applications; E. Wirth et al; ABB Review Apr. 1997, p 12–20.
Tranforming transformers; S. Mehta et al; *IEEE Spectrum,* Jul. 1997, pp. 43–49.
A study of equipment sizes and constraints for a unified power flow controller; J. Bian et al; IEEE Transactions on Power Delivery, vol. 12, No. 3, Jul. 1997, pp. 1385–1391.
Industrial High Voltage; F.H. Kreuger; *Industrial High Voltage* 1991 vol. I, pp. 113–117.
Hochspannungstechnik; A. Küuchler; Hochspannungstechnik, VDI Verlag 1996, pp. 365–366, ISBN 3–18–401530–0 or 3–540–62070–2.
High Voltage Engineering; N.S. Naidu; High Voltage Engineering ,second edition 1995 ISBN 0–07–462286–2, Chapter 5, pp91–98.
Performance Characteristics of a Wide Range Induction Type Frequency Converter; G.A. Ghoneem; Ieema Journal, Sep. 1995, pp 21–34.

International Electrotechnical Vocabulary, Chapter 551 Power Electronics;unknown author; International Electrotechnical Vocabulary Chapter 551: Power Electronics Bureau Central de la Commission Electrotechnique Internationale, Geneve; 1982, pp1–65.

Design and manufacture of a large superconducting homopolar motor; A.D. Appleton; IEEE Transactions on Magnetics, vol. 19, No. 3, Part 2, May 1983, pp 1048–1050.

Application of high temperature superconductivy to electric motor design; J.S. Edmonds et al; IEEE Transactions on Energy Conversion Jun. 1992, No. 2, pp 322–329.

Power Electronics and Variable Frequency Drives; B. Bimal; IEEE industrial Electronics—Technology and Applications, 1996, pp. 356.

Properties of High Plymer Cement Mortar; M. Tamai et al; *Science & Technology in Japan,* No. 63; 1977, pp 6–14.

Weatherability of Polymer–Modified Mortars after Ten–Year Outdoor Exposure in Koriyama and Sapporo; Y. Ohama et al; *Science & Technology in Japan* No. 63; 1977, pp 26–31.

SMC Powders Open New Magnetic Applications; M. Persson (Editor); *SMC Update,*vol. 1, No. 1, Apr. 1997.

Characteristics of a laser triggered spark gap using air, Ar, CH4,H2, He, N2, SF6 and Xe; W.D. Kimura et al; Journal of Applied Physics, vol. 63, No 6, Mar. 15, 1988, p. 1882–1888.

Low–intensy laser–triggering of rail–gaps with magnesium–aerosol switching–gases W FREY; 11th International Pulse Power Conference, 1997, Baltimore, USA Digest of Technical Papers, p. 322–327.

* cited by examiner

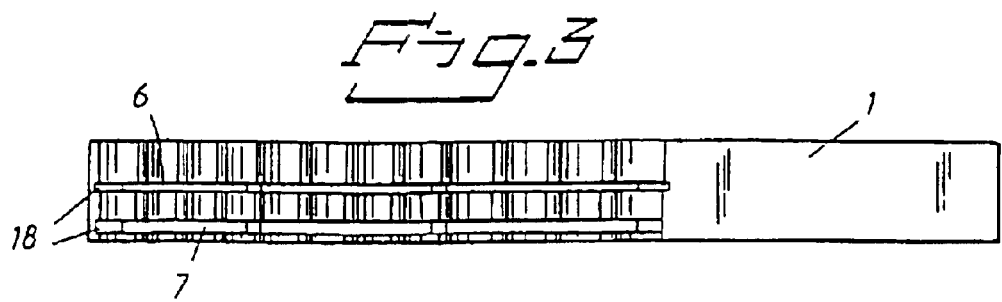
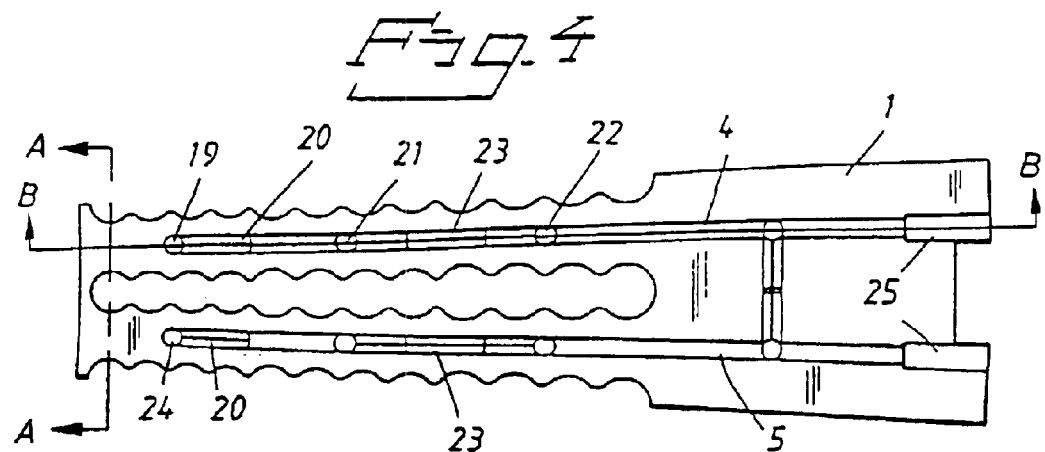
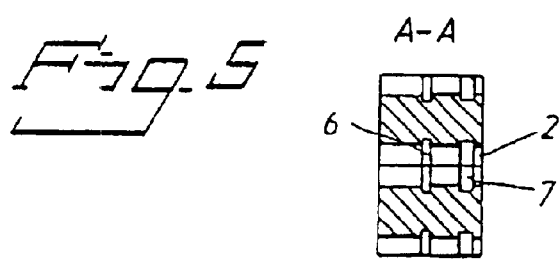
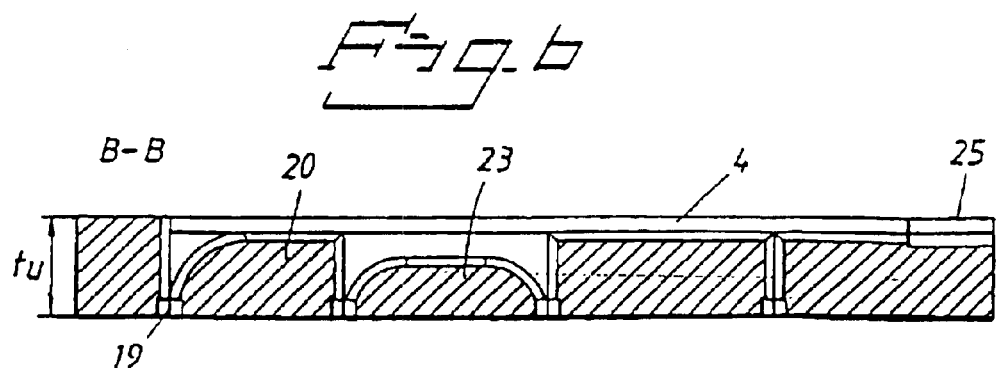

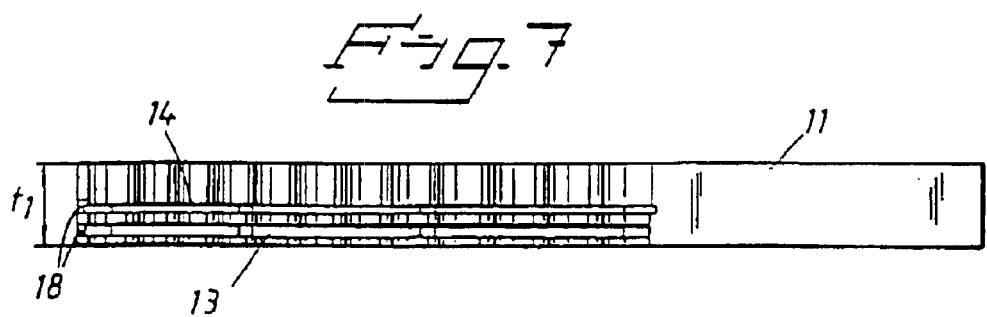
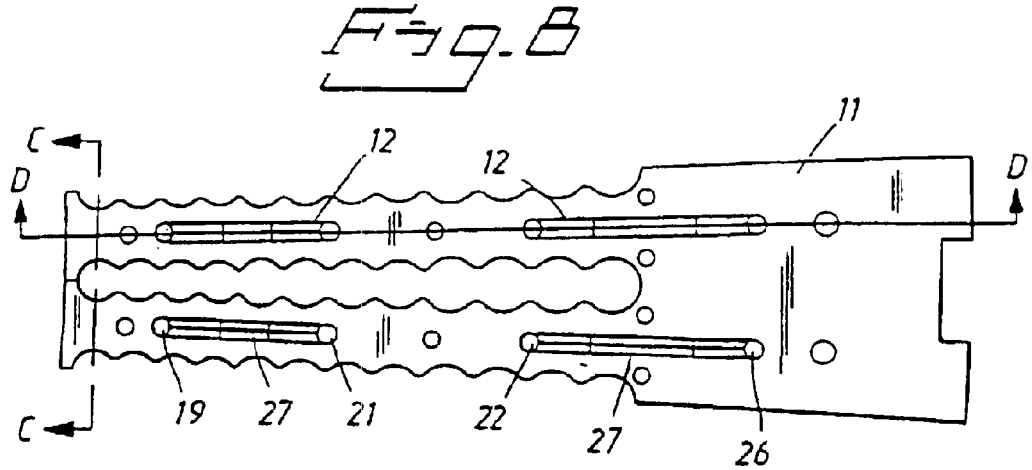
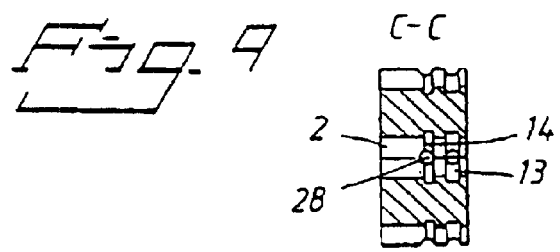
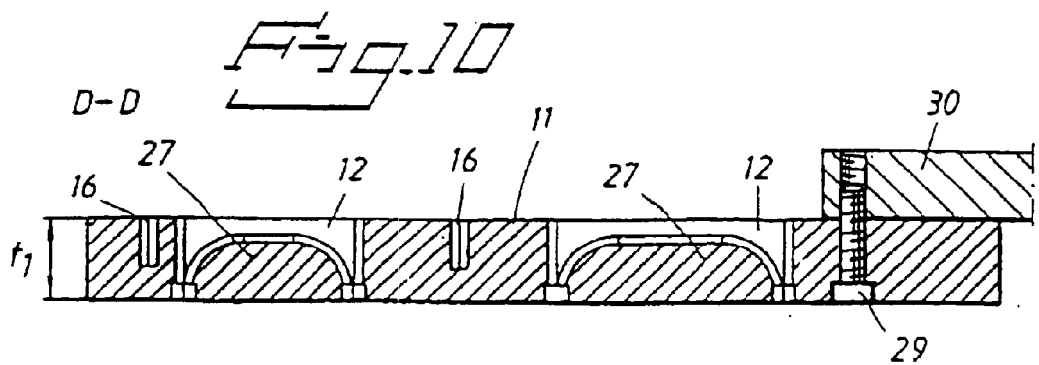

END PLATE

TECHNICAL FIELD

The present invention relates to rotating electric machines such as synchronous machines, as well as dual-fed machines, applications in asynchronous static current converter cascades, outerpole machines and synchronous flow machines, and also alternating current machines intended in the first place as generators in a power station for generating electric power. The invention relates particularly to the stator of such machines concerning an embodiment for cooling stator teeth and thus indirectly also to the insulated electric conductors constituting the stator winding.

BACKGROUND ART

Similar machines have conventionally been designed for voltages in the range 6–30 kV, and 30 kV has normally been considered to be an upper limit. This generally means that a generator must be connected to the power network via a transformer which steps up the voltage to the level of the power network, i.e. in the range of approximately 130–400 kV. The machine is intended for use with high voltages. High voltages shall be understood here to mean electric voltages in excess of 10 kV. A typical operating range for a device according to the invention may be voltages from 36 kV up to 800 kV. In the second place the invention is intended for use in the stated technical area with voltages below 36 kV.

Two different systems exist for air cooling in conventional cooling: Radial cooling where the air passes the rotor through the hub and radial ducts in the rotor, and axial cooling where the air is blow into pole gaps by axial fans. The stator is then divided into radial air ducts by means of (usually straight) spacers which are welded in place. In view of the poor thermal conductivity axially through the stator laminations the air ducts must be frequently repeated. The drawback of air cooling is that the ventilation losses are often considerable and that the stator must be made longer to accommodate the ventilation ducts. The ventilation ducts may also cause a weaker mechanical structure, particularly in the case of the high-voltage generators with long teeth under discussion here.

Axial water cooling by means of cooling tubes in the stator yoke is well known. Electrically insulated metal tubes have then necessarily been used so as not to short-circuit the laminations of the stator. The drawback is that if the insulation is damaged the generator may be destroyed by the induced currents then appearing. It is also expensive to weld or bend the tubes at the joins. Another drawback is that eddy currents are induced in metal tubes in a time-varying magnetic flow, resulting in certain power losses when they are used in an electric machine.

A conductor is known through U.S. Pat. No. 5,036,165, in which the insulation is provided with an inner and an outer layer of semiconducting pyrolized glassfiber. It is also known to provide conductors in a dynamo-electric machine with such an insulation, as described in U.S. Pat. No. 5,066,881 for instance, where a semiconducting pyrolized glassfiber layer is in contact with the two parallel rods forming the conductor, and the insulation in the stator slots is surrounded by an outer layer of semiconducting pyrolized glassfiber. The pyrolized glassfiber material is described as suitable since it retains its resistivity even after the impregnation treatment.

OBJECT OF THE INVENTION

By using high-voltage insulated electric conductors, in the following termed high-voltage cables, with solid insulation similar to that used in cables for transmitting electric power in the stator winding (e.g. XLPE cables) the voltage of the machine can be increased to such levels that it can be connected directly to the power network without an intermediate transformer. The conventional transformer can thus be eliminated. This concept generally requires the slots in which the cables are placed in the stator to be deeper than with conventional technology (thicker insulation due to higher voltage and more turns in the winding). This entails new problems with regard to cooling, vibrations and natural frequencies in the region of the coil end, teeth and winding.

The object of the invention is to provide a stator in a rotating electric machine with an end plate for use in direct cooling of the stator, particularly the stator teeth in a rotating electric machine of the type described, said cooling being achieved by means of cooling tubes running axially in the stator. The purpose of the stator plate is to provide protection for the cooling tubes at the ends of the stator. The cooling tubes are exposed to mechanical stress at each end of the stator during assembly, which is eliminated through the present invention.

Another object of the invention is for the stator plate to constitute a bending template for the cooling tubes during assembly. Additional advantageous further developments of the invention are indicated in the following description. The invention is in the first place intended to be used with a high-voltage cable defined in more detail below, and its advantages are particularly noticeable therewith.

SUMMARY OF THE INVENTION

The present invention relates to a stator end plate in connection with axial cooling of the stator and its laminated stack, particularly the stator teeth, and thus indirectly the stator winding in a rotating electric machine such as a high-voltage alternating current generator.

The plate is provided with axially running winding slots corresponding to the stator, and axially running apertures for inlet and outlet cooling tubes. The plate is also provided with slits in which bending members are situated, around which bending members the cooling tubes are arranged to be bent.

The end plate is also provided with assembly grooves intended to retain sealing member at the exit of each winding slot from the end plate.

In the device according to the invention the windings are preferably composed of cables having solid, extruded insulation, of a type now used for power distribution, such as XLPE-cables or cables with EPR-insulation. Such a cable comprises an inner conductor composed of one or more strand parts, an inner semiconducting layer surrounding the conductor, a solid insulating layer surrounding this and an outer semiconducting layer surrounding the insulating layer. Such cables are flexible, which is an important property in this context since the technology for the device according to the invention is based primarily on winding systems in which the winding is formed from cable which is bent during assembly. The flexibility of a XLPE-cable normally corresponds to a radius of curvature of approximately 20 cm for a cable 30 mm in diameter, and a radius of curvature of approximately 65 cm for a cable 80 mm in diameter. In the present application the term "flexible" is used to indicate that the winding is flexible down to a radius of curvature in the order of four times the cable diameter, preferably eight to twelve times the cable diameter.

The winding should be constructed to retain its properties even when it is bent and when it is subjected to thermal stress during operation. It is vital that the layers retain their adhesion to each other in this context. The material properties of the layers are decisive here, particularly their elasticity and relative coefficients of thermal expansion. In a XLPE-cable, for instance, the insulating layer consists of cross-linked, low-density polyethylene, and the semiconducting layers consist of polyethylene with soot and metal particles mixed in. Changes in volume as a result of temperature fluctuations are completely absorbed as changes in radius in the cable and, thanks to the comparatively slight difference between the coefficients of thermal expansion in the layers in relation to the elasticity of these materials, the radial expansion can take place without the adhesion between the layers being lost.

The material combinations stated above should be considered only as examples. Other combinations fulfilling the conditions specified and also the condition of being semiconducting, i.e. having resistivity within the range of $10^{-1}$–$10^6$ ohm-cm, e.g. 1–500 ohm-cm, or 10–200 ohm-cm, naturally also fall within the scope of the invention.

The insulating layer may consist, for example, of a solid thermoplastic material such as low-density polyethylene (LDPE), high-density polyethylene (HDPE), polypropylene (PP) polybutylene (PB), polymethyl pentene (PMP), cross-linked materials such as cross-linked polyethylene (XLPE), or rubber such as ethylene propylene rubber (EPR) or silicon rubber.

The inner and outer semiconducting layers may be of the same basic material but with particles of conducting material such as soot or metal powder mixed in.

The mechanical properties of these materials, particularly their coefficients of thermal expansion, are affected relatively little by whether soot or metal powder is mixed in or not—at least in the proportions required to achieve the conductivity necessary according to the invention. The insulating layer and the semiconducting layers thus have substantially the same coefficients of thermal expansion.

Ethylene-vinyl-acetate copolymers/nitrile rubber, butyl graft polyethylene, ethylene-butyl-acrylate-copolymers and ethylene-ethyl-acrylate copolymers may also constitute suitable polymers for the semiconducting layers.

Even when different types of material are used as base in the various layers, it is desirable for their coefficients of thermal expansion to be substantially the same. This is the case with combination of the materials listed above.

The materials listed above have relatively good elasticity, with an E-modulus of E<500 MPa, preferably <200 MPa. The elasticity is sufficient for any minor differences between the coefficients of thermal expansion for the materials in the layers to be absorbed in the radial direction of the elasticity so that no cracks appear, or any other damage, and so that the layers are not released from each other. The material in the layers is elastic, and the adhesion between the layers is at least of the same magnitude as the weakest of the materials.

The conductivity of the two semiconducting layers is sufficient to substantially equalize the potential along each layer. The conductivity of the outer semiconducting layer is sufficiently large to enclose the electrical field in the cable, but sufficiently small not to give rise to significant losses due to currents induced in the longitudinal direction of the layer.

Thus, each of the two semiconducting layers essentially constitutes one equipotential surface, and these layers will substantially enclose the electrical field between them.

There is, of course, nothing to prevent one or more additional semiconducting layers being arranged in the insulating layer.

BRIEF DESCRIPTION OF THE DRAWINGS

The invention will now described in more detail with reference to the accompanying drawings.

FIG. 3 shows a radial side view of the upper end plate in FIG. 1, FIG. 4 shows a radial top view of the end plate in FIG. 3, FIG. 5 shows an axial section A—A through the plate, taken as shown in FIG. 4, FIG. 6 shows a radial section B—B through the plate, taken as shown in FIG. 4, FIG. 7 shows a radial side view of the lower end plate in FIG. 2, FIG. 8 shows a radial top view of the end plate in FIG. 7, FIG. 9 shows an axial section C—C through the plate, taken as shown in FIG. 8, FIG. 10 shows a radial section D—D through the plate, taken as shown in FIG. 8.

DESCRIPTION OF THE INVENTION

Figure 1:
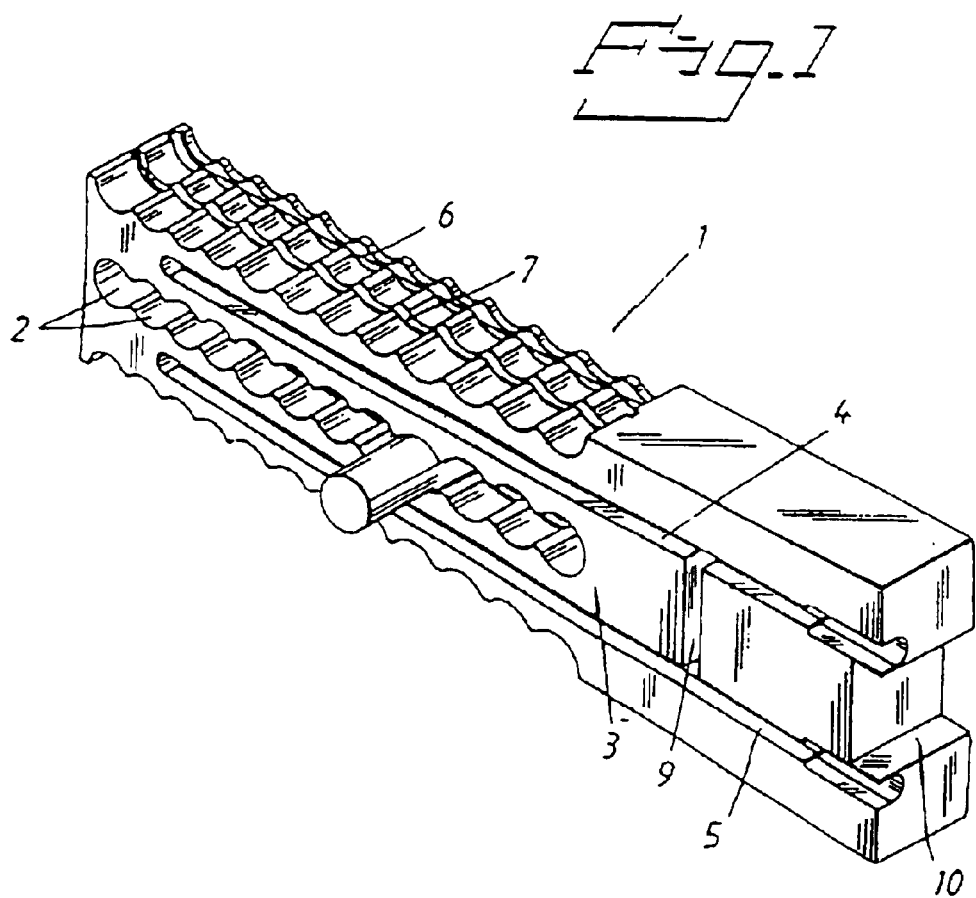
FIG. 1 shows a perspective view of an upper end plate according to the invention, in a rotating electric machine with vertical axis of rotation.

FIG. 1 shows an upper stator end plate 1 provided with 10–12 axially running winding slots 2 corresponding to a stator, arranged radially, the number depending on the design of the stator, said winding slots forming a radial chain slot 3. The stator end plate is also provided with an inlet slit 4 and an outlet slit 5 for cooling tubes with flows to and from the laminated stack. The stator end plate 1 is in the form of a circle sector with one, two or more chain slots. The sectors are assembled side by side to form a whole circular plate covering one end of the stator (the upper end if the axis of the machine is vertical). The plate 1 is also provided with two upper casting channels 6, 7 arranged radially in the chain slot 3 in order to embed an upper sealing member 8 at the exit of each winding slot 2 from the plate 1 (only one sealing member is shown in FIG. 1) FIG. 1 also shows a transverse slit 9 for cooling tubes running in the stator yoke. A recess 10 is also provided for the fixing bar of the "core".

Figure 2A:
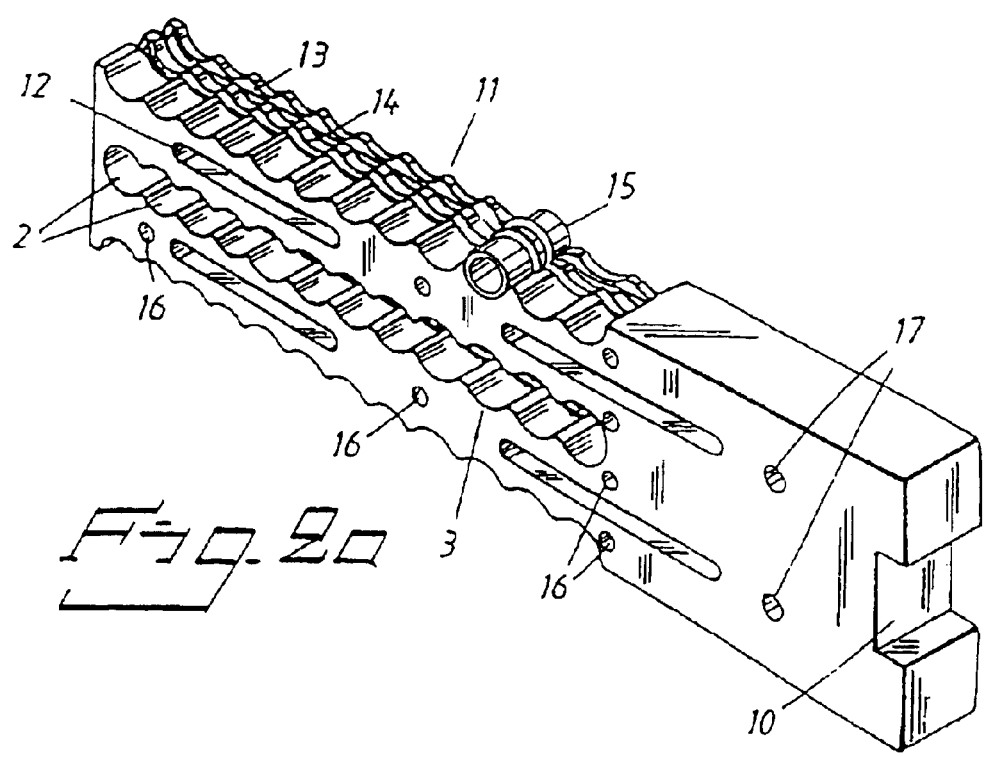
FIG. 2a shows a perspective view of a lower end plate according to the invention, in a rotating electric machine with vertical axis of rotation.
Figure 2B:
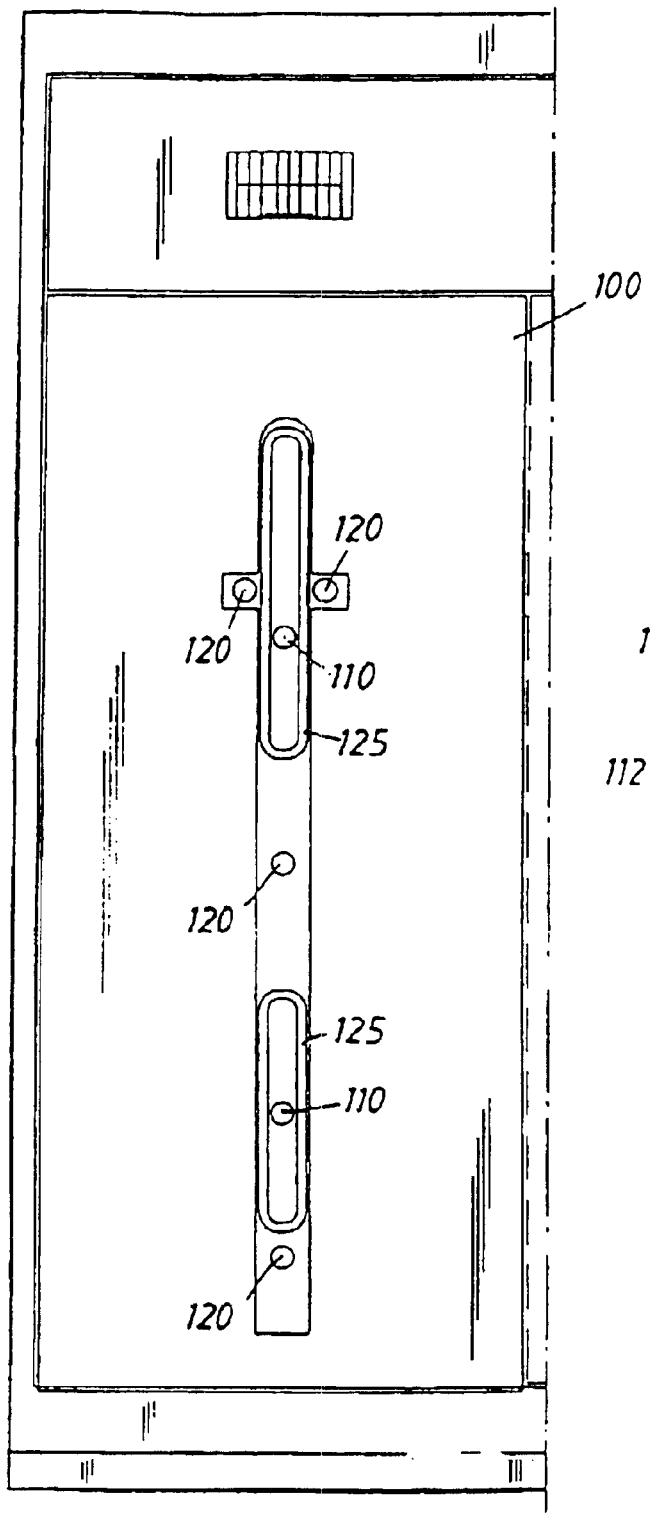
FIG. 2b shows a casting device according to the present invention.

FIG. 2a shows a lower stator end plate 11 which, in equivalent manner to the upper stator end plate in FIG. 1, is provided with the same number of axially running winding slots 2 corresponding to the stator as in the upper plate (10–12), arranged radially and in equivalent manner forming a radial chain slot 3. The lower stator end plate 11 is provided with one or more turn-around slits 12 in which cooling tubes are arranged to run out of the laminated stack, turn and run into it again. As described for the upper plate, the lower stator end plate 11 is designed as a circle sector with one, two or more chain slots. The sectors are assembled side by side to form a whole circular plate covering one end of the stator (in this case the lower end if the axis of the machine is vertical). The stator end plate 11 is also provided with two lower casting channels 13, 14 arranged radially in the chain slot 3 in order to embed a lower sealing member 15 at the exit of each winding slot 2 from the plate 1 (only one sealing member is shown in this Figure as well). As can be seen in the Figures, these sealing members may be shaped differently depending on which plate they belong to. They may also protrude different lengths from the plate depending on the protection each member is to provide. The lower stator end plate 11 is also provided with a recess 10 for the fixing bar of the "core". FIG. 2 also shows that the lower stator end plate 11 is provided with a number of attachment holes 16 for a casting device 100, see FIG. 2b, and assembly holes 17 for a locking bolt that locks the plate 11 to a lower thick metal sheet constituting an annular part of the stator frame.

FIG. 2b shows the casting device 100 provided with nipples 110 in the region of the turn-around slits 12. The casting device 100 is arranged to be connected to the lower stator end plate 11 by attachment bolts 120. The casting device 100 is also provided with rubber seals 125 against the end plate, at silicon embedment of the cooling tubes.

The procedure for embedding the sealing members is for detachable tools in the form of cylindrical plugs for casting the members to be fitted on the end plate and casting compound injected into a casting inlet in the plate, the compounding then spreading to all the cable positions.

The procedure for casting cooling tubes is that the casting device is sealingly connected to a first laminar plate and silicon is then forced in around the cooling tubes until the silicon "runs out" at the upper end plate. The casting device is then removed and attached to another laminar plate and the injection procedure is repeated, and so on until all cooling tubes have been embedded in silicon. The cooling tubes are thus embedded both inside the end plates and inside the stator. Furthermore, the casting device can be used again.

Two separate casting processes are thus used, one for sealing members and the other for cooling tubes. Different types of silicon are often used for these processes.

Figure 2C:
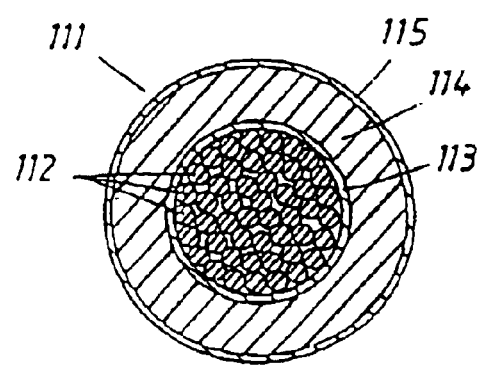
FIG. 2c shows a section through a high-voltage cable used in conjunction with the present invention.

FIG. 2c shows a cross section through a high-voltage cable 111 for use in connection with the present invention. The high-voltage cable 111 is composed of a number of strand parts 112 made of copper (Cu), for instance, and having circular cross section. These strand parts 112 are arranged in the middle of the high-voltage cable 111. Around the strand parts 112 is a first semiconducting layer 113. Around the first semiconducting layer 113 is an insulating layer 114, e.g. XLPE-insulation, and around the insulating layer 114 is a second semiconducting layer 115. The concept "high-voltage cable" in the present application thus does not include the outer sheath that normally surrounds such a cable for power distribution. The high-voltage cable has a diameter within the interval 20–250 mm and a conducting area within the interval 40–3000 mm$^2$.

FIG. 3 shows both casting channels 6, 7 of the upper stator end plate 1, and a casting inlet 18 for injecting the casting compound.

FIG. 4 shows the upper stator end plate 1 from above, with an inlet aperture 19 for a cooling tube in the inlet slit 4, and a first bending member 20 for this cooling tube. Cooling tube apertures for returning cooling tubes are also shown, with turning members 23 between them. As indicated in the Figure, the outlet slit 5 is arranged in corresponding manner, with an outlet aperture 24 and corresponding first and second bending members 20, 23. The inlet and outlet slits 4, 5 are also provided with turned cavities 25 of thicker diameter on the yoke side of the stator, to enable connection of the cooling tube to a thicker tube for extra protection.

In an axial section through the plate; FIG. 5 shows a winding slot 2 and the upper casting channels 6, 7.

In a radial section through the plate, FIG. 6 shows the inlet slit 4 which extends from the inlet aperture 19 to the turned cavity 25. It can be seen from this Figure that the 35 first bending member 20 is higher than the second bending member 23 so that the cooling tube acting as inlet to the stator is closer to the surface than the cooling tube that. returns in this plate, i.e. the cooling tubes are situated one above the other in the inlet slit 4.

For the upper stator end plate 1 the plate thickness $t_u$, is such that $t_u \geq 2F_r$, where $F_r$ is the external diameter of the cooling tube so that all cooling tubes are covered by the plate.

FIG. 7 shows the two casting channels 13, 14 of the lower stator end plate 11, and a casting inlet 18 for injection of casting compound. What differentiates the lower plate from the upper plate is that the plate thickness $t_l$ is less and that the casting channels 13, 14 are closer together.

FIG. 8 shows the lower stator end plate 11 from its outer side, revealing its turn-around slits 12, the cooling-tube apertures 19, 21, 22 and a cooling-tube aperture 26 located in the stator yoke. All these cooling-tube apertures 19, 21, 22, 26 constitute openings in this plate for returning cooling tubes with third bending members 27 between them.

In an axial section through the plate in FIG. 8, FIG. 9 shows a winding slot 2 and the lower casting channels 13, 14. The section also reveals that the lower plate is provided with an opening 28 for the casting device.

FIG. 10 shows a radial section through the lower stator end plate 11 and through a lower, thick metal sheet 30 connected to the plate by a locking bolt 29. The three bending members 27 are also shown recessed in the turn-around slits 12, as well as the attachment holes for the casting device. The lower plate is thus designed for cooling tubes that return inside the plate. Since no inlets or outlets are arranged in the lower plate, the thickness of this plate can be kept to a minimum. For the stator end plate 11, therefore, the plate thickness $t_l$ is such that $t_l \geq F_r$, where $F_r$ is the outer diameter of the cooling tube, so that all cooling tubes are covered by the plate.

Figure 11:
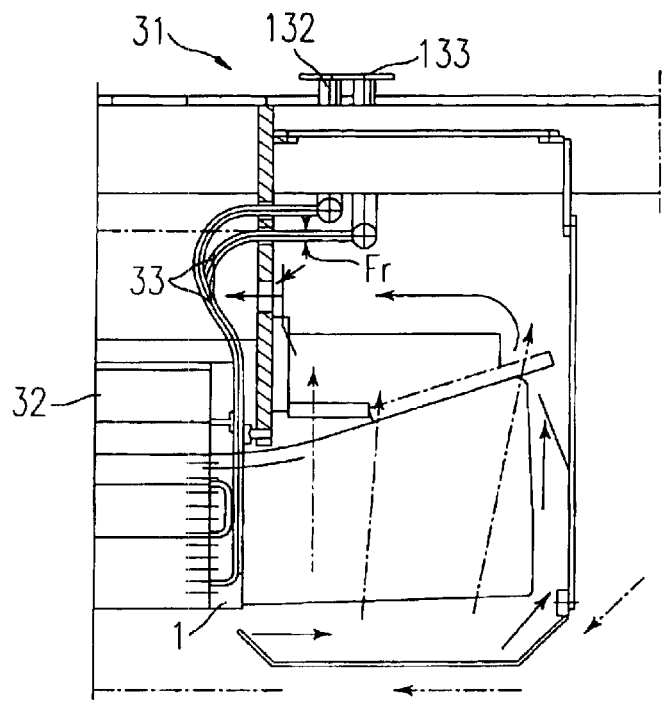
FIG. 11 shows a how the cooling tubes are drawn through the upper end plate, fitted at the upper end of the stator.

FIG. 11 shows a section through a part of a stator 31 provided with cooling tubes, with its stator core 32, at one end of which the stator end plate 1 is fitted. It is clear from the Figure that all the cooling tubes 33 running in the inlet and outlet slits are recessed in the stator end plate 1 so that they are protected from mechanical stress. The cooling tubes 33 are also connected to an inlet circuit 132 for inlet medium and an outlet circuit 133 for outlet medium.

Figure 12:
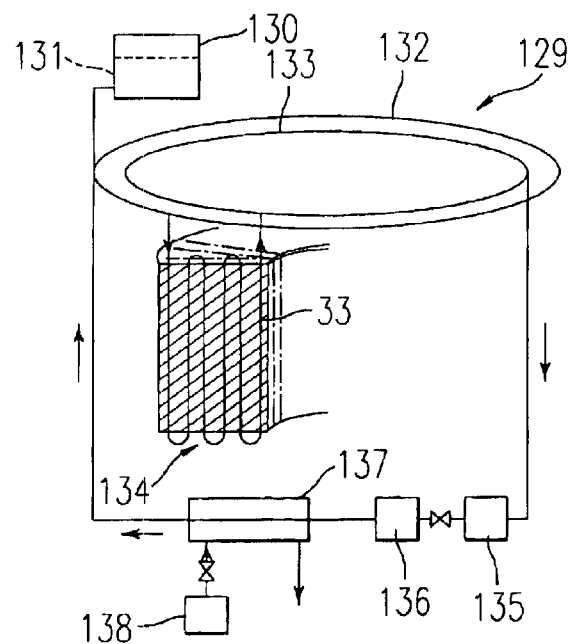
FIG. 12 shows a cooling circuit in conjunction with the present invention.

FIG. 12 shows that all cooling tubes are connected to a closed cooling circuit 129 which, in the embodiment shown, comprises a tank 30 containing the coolant 131 which may be water, hydrogen or other coolant. The tank 130 is provided with a level indicator for controlling and monitoring the level of the coolant. The tank 130 is also connected to two annular tubes consisting of the inlet circuit 132 and outlet circuit 133. Between the inlet circuit 132 and the outlet circuit 133 a number parallel circuits is connected, the number often corresponding to the number of stator teeth or tooth sides provided with cooling tubes, One of these parallel circuits 134 is shown in FIG. 12. The coolant 131 is arranged to circulate from the inlet circuit 132, simultaneously through all the parallel circuits 134, to the outlet circuit 133 and on to a circulation pump 135, to a circulation filter 136 through a heat-exchanger 137, e.g. a plate heat-exchanger, and then back to the inlet circuit 132. Water from a water supply is fed by an exchanger pump 138 through one end of the heat-exchanger 137 via a filter, not shown. The water is pumped through the exchanger and back to the water supply.

The stator end plates described are preferably made from laminated material. They may be in the form of a completely circular plate instead of being divided into sectors as described above. Furthermore, all cooling tubes are embedded in silicon rubber in the stator, in order to improve the heat transfer between the laminated stack and cooling tubes.

The stator end plate, either upper or lower, has an axial thickness t such that $t \geq F_r$, where $F_r$ is the outer diameter of the cooling tube. The designation t may here represent either $t_l$ or $t_u$.

The second and third bending members 23, 27 of the stator end plates are bent in one or two steps, each step constituting an angle of 90° as shown in FIGS. 6 and 10, or in one step with an angle of 180°, i.e. as a semi-circle, if the distance between the cooling tubes corresponds to the diameter of the bending circle. The first bending member 20 at the inlet aperture and outlet aperture is bent in one step at an angle of 90°. The bending members 20, 23, 27 are thus bent in one or two steps, each step constituting an angle of 90°.

What is claimed is:

1. An end plate for a stator of a rotating electric machine wound with a cable, comprising:
    axially running winding slots corresponding to winding slots in the stator;
    axially running apertures configured to receive a cooling tube; and
    at least one bending member pre-shaped in the end plate and configured to direct the cooling tube into the apertures, wherein
    the axially running winding slots are configured as a radial chain slot having at least one slot, each of the at least one slots having a round shape corresponding to a cross section of the cable, and
    the axially running apertures are configured to provide cooling to at least stator teeth forming the winding slots.

2. An end plate as claimed in claim 1, wherein the end plate is radially divided into sectors, each sector corresponding to one or more slot divisions.

3. An end plate as claimed in claim 1, wherein the end plate comprises a laminated material.

4. An end plate as claimed in claim 1, wherein the end plate has an axial thickness t such that $t > F_r$, $F_r$ being an external diameter of the cooling tubes.

5. An end plate as claimed in claim 1, wherein the end plate has casting channels for receiving a sealing member, at an exit of each winding slot from the end plate.

6. An end plate as claimed in claim 1, wherein the cable comprises a high-voltage cable.

7. An end plate as claimed in claim 1, wherein the end plate is dimensioned for receiving a high-voltage cable having a diameter of about 20 mm to about 250 mm and a conducting area of about 40 mm$^2$ to about 3000 mm$^2$.

8. An end plate as claimed in claim 1, wherein the cable comprises a conductive core and an electric field confining insulating covering surrounding the core.

9. An end plate as claimed in claim 1, wherein the bending member is bent in at least one step of 90°.

10. An end plate as claimed in claim 9, wherein the cooling tube has an outlet and the end plate has at least one inlet slit for the outlet of the cooling tube.

11. An end plate as claimed in claim 10, wherein the end plate has attachment holes for insertion of a casting device.

12. An end plate as claimed in claims 11, having at least one turn around slot therein, and wherein the casting device is shaped to seal at least one of the turn-around slits of the end plate and includes a nipple for pressing a casting compound therein.

13. An end plate as claimed in claim 9, wherein the end plate has a turn-around slit for at least one bending member.

14. An end plate as claimed in claim 1, wherein the winding is flexible and comprises an electrically conducting core surrounded by an inner semiconducting layer, an insulating layer surrounding the inner semiconducting layer formed of solid material, and an outer semiconducting layer surrounding the insulating layer, said layers being adhered to each other.

15. An end plate as claimed in claim 14, wherein a material of the inner semiconducting layer, a material of the insulating layer, and a material of the outer semiconducting layer each having an elasticity and a coefficient of thermal expansion such that a change in volume in the layers caused by temperature fluctuations during operation is absorbed by the elasticity of the materials so that the layers retain their adhesion to each other at the temperature fluctuations occurring during operation.

16. An end plate as claimed in claim 14, wherein a material of the inner semiconducting layer, a material of the insulating layer, and a material of the outer-semiconducting layer each having an E-modulus less than about 500 MPa.

17. An end plate as claimed in claim 14, wherein the coefficients of thermal expansion for the materials in said layers are substantially the same.

18. An end plate as claimed in claim 14, wherein an adhesion between the layers is of at least a same magnitude as a strength of a weakest one of a material of the inner semiconducting layer, a material of the insulating layer, and a material of the outer semiconducting layer.

19. An end plate as claimed in claim 14, wherein each of the semiconducting layers comprises an equipotential surface.

20. An end plate as claimed in claim 14, wherein a material of the inner semiconducting layer, a material of the insulating layer, and a material of the outer semiconducting layer each having an E-modulus less than about 200 MPa.

21. A procedure for supporting and protecting a cooling tube in a first axially running aperture at its exit from a stator in a rotating electric machine, comprising the steps of applying an end plate provided with bending members at the end of the stator, bending the cooling tube around the bending member before continuing, by at least one of being fitted in a second axially running aperture in the stator and for extension out of the stator, wherein
    the end plate includes axially running winding slots corresponding to winding slots in the stator and configured as radial chain slots having at least one slot, each of the at least one slots having a round shape corresponding to a cross section of a cable winding, and
    the first axially running aperture and the second axially running aperture are configured to provide cooling to at least stator teeth forming the winding slots.

22. A rotating electric machine, comprising:
    a stator having stator slots, each stator slot including a plurality of winding slots formed by stator teeth running axially, the plurality of winding slots being arranged radially along the stator slot;

a winding of a high-voltage cable drawn through the winding slots; and an end plate including
- a plurality of winding slots running axially and corresponding to the plurality of winding slots,
- a plurality of apertures running axially and configured to receive a cooling tube, and
- at least one bending member pre-shaped in the end plate and configured to direct the cooling tube into the plurality of apertures, wherein the plurality of apertures are configured to provide cooling to at least the stator teeth.

* * * * *